Nov. 1, 1932.  F. H. GLEASON  1,886,006
LUBRICATOR
Filed Sept. 28, 1926   2 Sheets-Sheet 1

INVENTOR.
BY F. H. Gleason
Denison Thompson
ATTORNEYS.

WITNESS
H. V. Furst.

Nov. 1, 1932.  F. H. GLEASON  1,886,006
LUBRICATOR
Filed Sept. 28, 1926  2 Sheets-Sheet 2
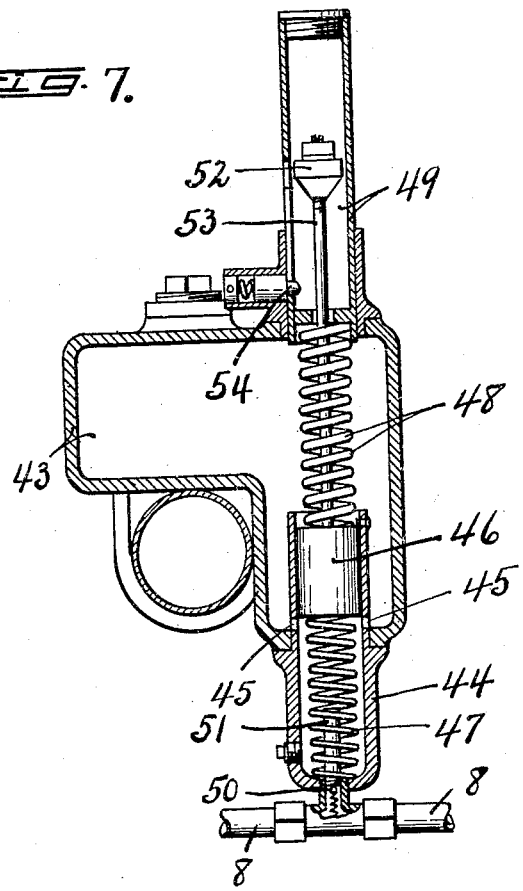
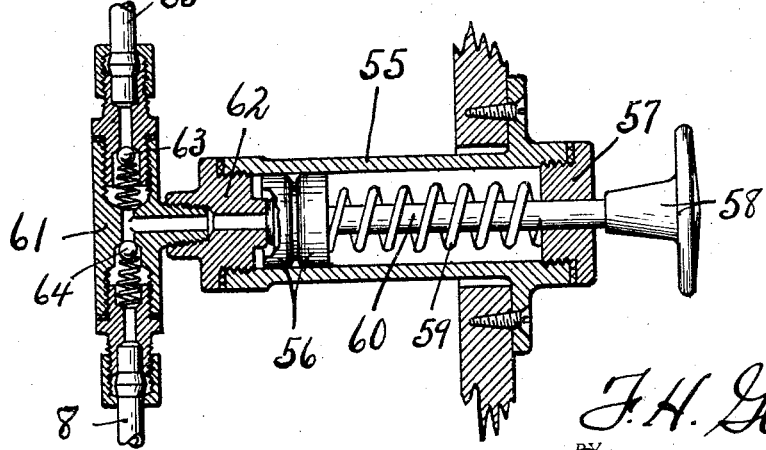
INVENTOR.
F. H. Gleason
ATTORNEYS.
WITNESS Patented Nov. 1, 1932

1,886,006

UNITED STATES PATENT OFFICE

FREDERICK H. GLEASON, OF AUBURN, NEW YORK, ASSIGNOR TO BOWEN PRODUCTS CORPORATION, OF AUBURN, NEW YORK, A CORPORATION OF NEW YORK

LUBRICATOR

Application filed September 28, 1926. Serial No. 138,234.

This invention relates to certain new and useful improvements in lubricators. The invention relates to improvements made on a control device for which a patent was issued to J. D. Fitzgerald, No. 458,450, August 25, 1891. The improvements relate to a more efficient disposition and form of parts which permit cheap commercial manufacture, and the addition of means for insuring positive complete loading of the device with oil at each operation, and of preventing any gravity oil leaks through the device.

The invention relates to devices or controls which are adapted to be connected to bearings requiring lubrication, the devices being connected to each other, and to a source of oil supply by means of tubes, the source of oil supply having means for applying and relieving pressure to the oil in the connecting tubes.

Figure 7 is a section on line 7—7, Figure 1.

Figure 8 is a section through a different form of pump.

The apparatus of this invention, as illustrated in Figs. 1 to 6 comprises a cylindrical body —1— provided with a threaded portion —23— for attachment in an oil-tight relation with the elbow tubing fitting —6— or the T-tubing fitting —7—.

The lower portion of the body —1— is internally reduced in diameter to form a shoulder —40— having a rounded edge —22—, a cylindrical chamber 5—5 being formed within the portion of reduced diameter. The chamber —5— is closed at its bottom except for an outlet opening —25— and the lower side of the bottom wall is preferably formed with an annular or ring projection —17— adapted to form a check valve seat.

As illustrated, the check valve assembly comprises a disk —18— of material such as leather adapted to contact with the annular projection —17— and a circular disk —19— of metal backing up the leather disk. A spring —20— maintains the leather disk —18— in contact with the valve seat —17— through pressure on the disk —19—, which disk is preferably provided with a portion of reduced diameter which the spring surrounds and by means of which the spring is held in a concentric position in the check valve space. The opposite end of the spring may be held in the check valve space of the body —1— in any suitable manner, as by turning in a collar —30— from the metal of the cylinder body —1—.

An assembled piston structure —11— is provided with an enlarged portion at its upper end which supports a leather cup washer —12— which is attached to the piston —11— by a threaded nut 13—. The nut —13— is provided with a screw driver slot —27— for assembly purposes and also to provide an oil passage leading from the tubing fitting —6— or —7— to the space within the body —1— above the cup-washer —12— when the piston is maintained at the top of the cylinder.

The piston assembly has an intermediate reduced portion —28— and is provided with an enlarged head —26— at its lower end. This enlarged head —26— is provided with rounded corners at its lower and upper end adapted to operate through the leather washer —16—.

Figure 2:
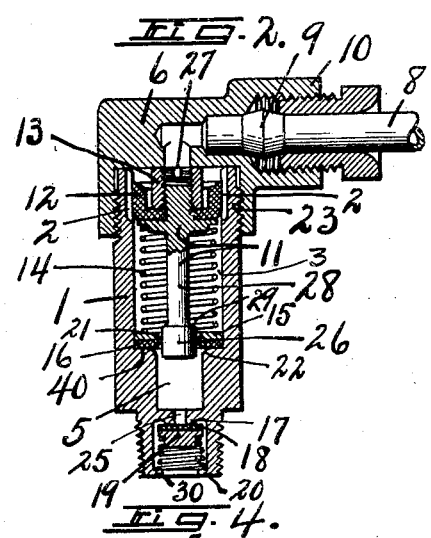
Figure 2 is a sectional view through a control device provided with an elbow connection for the supply tube.
Figures 4, 5:
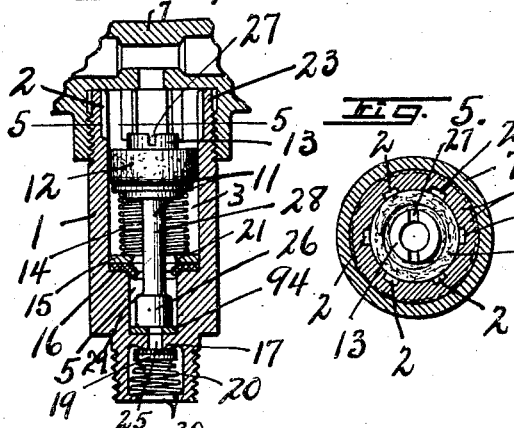
Figure 4 is a view similar to Figure 3 with portions of the control device in the position which they assume after delivery of a measured volume of oil has been effected.
Figure 5 is a section on line 5—5, Figure 4.

The leather washer —16— is held in place upon the shoulder —40— in the body —1— by a metal washer —15— and the edge —21— of this metal washer is rounded in a manner to incline in the direction opposite to the inclination of the rounded edge —22— on shoulder —40— to thereby allow the leather washer —16— to assume the position shown in Figure 2, when the control device is in position to deliver a measured volume of oil and to allow the leather washer —16— to assume the position shown in Figure 4 after the control has delivered a measured volume of oil. A spring —14— normally maintains the piston assembly —11— at the top of the cylindrical body —1— and also maintains the metal washer —15— against the leather washer —16—, thereby holding the latter in position.

The piston assembly is provided with a portion of reduced diameter which the upper end of the spring surrounds so as to maintain the spring concentric in the cylindrical body.

The cylindrical body —1— is further provided with grooved ports or oil passages —2— herein illustrated as six (6) in number, and which extends from the space above the leather cup washer —12— to the space below the leather cup washer when the piston assembly —11— is at the top of the cylinder. These ports constitute bypasses around the leather cup washer.

In Figure 4 there is illustrated a metal washer —94— which is adapted to be placed below the head —26— of the piston assembly —11— in the chamber —5— of the cylindrical body to limit or shorten the stroke of the piston assembly —11— and thereby cut down the amount of oil delivered by a control device at each operation of the system.

One or more of these washers can be assembled in the control to permit the supply of any pre-determined required volume of oil at each operation of the control, the more washers installed the smaller the volume of oil delivered.

Figure 3:
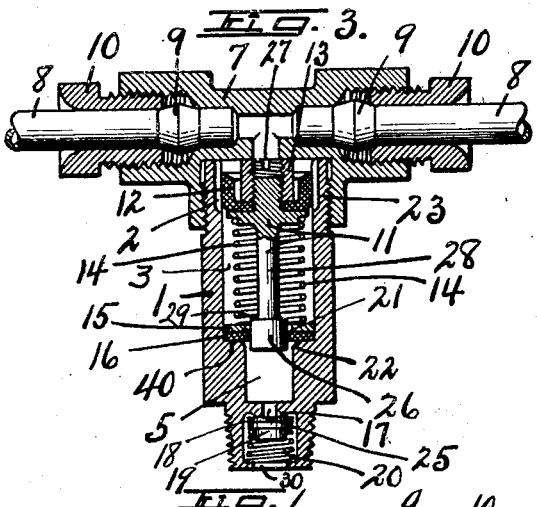
Figure 3 is a sectional view of a control device provided with a T-tubing connection for attachment to the supply tube and to additional control devices.
Figure 6:
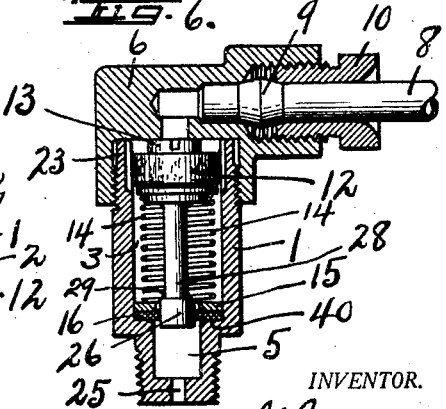
Figure 6 is a view similar to Figure 2 of a structure omitting the outlet control valve.

A tubing connection in the form of an elbow, as shown in Figures 2 and 6, or in the form of a through or T-connection, as shown in Figures 3 and 4, can be provided and which has attaching means for one or more cylinder bodies —1— with their assembled parts to provide a header construction having as many outlets as are required.

The oil tubes —8— are attached to the tubing connections by means of tapered sleeves —9— and tubing nuts —10— of conventional construction.

Figure 1:
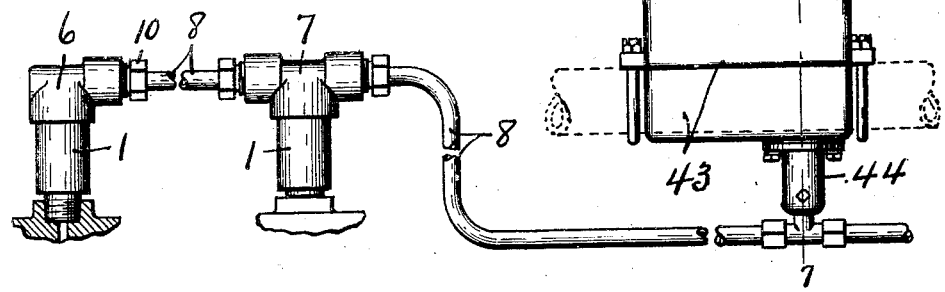
Figure 1 is an elevation of a portion of an apparatus illustrative of this invention.

The control devices are actuated by pressure of lubricant in the tubes —8— and the means for supplying oil under pressure to the tubes —8— may be a hand-operated pump of ordinary construction, a pump operated by spring pressure such as that disclosed in my co-pending application Serial No. 498,740 which has become patent No. 1,629,453 issued May 17, 1927 and illustrated in Figures 1 and 7 hereof, or it may be a pump operated by power taken from a moving shaft or part of the machine which is lubricated, such a power-operated pump of any known construction operating all of the controls connected in the system at time intervals controlled by the speed of the machine.

The pump shown in Figures 1 and 7 comprises in general a reservoir —43—, a cylinder —44— at the lower end of the reservoir and having a portion projecting upwardly into the reservoir and provided with ports —45— permitting the flow of oil from the reservoir to the cylinder. Piston —46— is arranged in the cylinder and is normally held at the limit of its upward movement by spring —47—, a second spring —48— being confined between the upper end of the piston —46— and the lower end of a piston-actuating member —49—, in this instance in the form of a cylinder. The outlet from the pump is provided with a spring closed check valve —50— and a screen —51— preferably surrounding the opening.

It will be obvious that with this structure the ejection of oil into the tubes —8— is effected wholly by the application of spring pressure. When the cylinder —49— is moved downwardly its movement is transferred to piston —46— through the medium of spring —48—, which spring as compressed overcomes the tension of spring —47— and the piston —46— moves downwardly in the cylinder to eject the lubricant therefrom, and this movement of piston —46— continues until a balance is reached between the spring pressures upon opposite sides of the piston, the head —52— on rod —53— connected to piston —46— acting to shift the pawl —54— rearwardly to release the actuating member —49— and permit its return to the position shown in Figure 7.

In Figure 8 a different form of pump is shown comprising a cylinder —55— containing a piston assembly —56— which includes two oppositely facing cup-leathers, the piston rod extending outwardly through the end cap —57— and being provided with an operating handle —58—, the spring —59— being positioned between the piston assembly and the end cap —57— and surrounding the piston rod —60—. A fitting —61— is secured to the end head —62— of cylinder —55— and is provided with oppositely acting check valves —63— and —64—, the inlet tube —65— and the outlet tube —8— being secured to the fitting in any suitable way.

When the piston assembly is moved rearwardly by the action of handle —58— compressing spring —59—, lubricant is drawn from the source of supply such as a tank, through tube —65—, fitting —61—, head —62—, into the cylinder, and thereafter the spring —59— will move the piston assembly forwardly, ejecting the oil or lubricant from the cylinder past valve —64—, thus producing the required pressure of lubricant in the system to operate the controls.

The operation of the structure may be generally described as follows:

When the oil pressure is raised in tube 8, the oil under pressure passes into the control device through the slot 27 around the leather cup washer 12 through the ports or oil passages 2. The piston assembly 11 is supported at the top of the cylinder by the spring 14. The leather washer 16 is positioned, as shown in Figure 2. The increase of oil pressure in the control device causes the leather washer 16 to be pressed tightly against the enlarged portion 26 of the piston assembly. The oil pressure acting on the upper portion of the cup washer and on the upper annular portion of the head 26 exerts a force tending to move the assembly toward the outlet while pressure exerted on the exposed portion at the underside of the cup washer 26 tends to resist such movement. The effective moving force is, therefore, equal to the pressure per square inch times an area equal to the area of the head 26. Continued movement of the assembly —11— allows the leather cup washer —12— to descend until the lower end of ports or oil passages —2— are sealed by the cup-washer —12—, the oil trapped in cylinder space —3— between the cup-washer —12— and leather washer 16 locks or prevents any further downward movement of piston assembly 11, the continued rise in pressure applied through tube —8— now acts on the complete area of the leather cup-washer —12— and through same on the trapped volume of oil between the lower part of cup-washer —12— and leather washer —16—, leather washer —16— then reverses to the position shown in Figure 4 allowing piston assembly 11 to descend, forcing a volume of oil equal to the difference in area between the larger diameter of piston assembly 11 (at —12), and the smaller diameter of piston assembly —11— (at —26—) times the stroke length through the reduced diameter of cylinder space —5—, oil passage —25—, opening check valve assembly 18—19—20 and to the bearing, the lower end of piston assembly 11 bottoming at the bottom of space —5— of cylinder body —1— preventing any further travel of the piston, and thus controlling the volume that is delivered at each operation by limiting the stroke of assembly 11.

At the same time that the leather washer —16— is reversing, the reduced diameter —28— of piston assembly 11 passes the leather washer —16—, providing an oil passage from space —3— in cylinder body —1— to the passage —25— leading into the check valve assembly. Continued pressure of oil on the control only causes the leather cup washer to more tightly seal against the wall of the cylinder space —3— in cylinder body —1—.

When the oil pressure is relieved in tube —8—, the check valve assembly —18—, —19—, —20— having closed after the delivery of oil from the piston space, piston assembly —11— is returned to its top position by spring —14—, a vacuum being formed in spaces —5— and —3— of cylinder body —1—, this vacuum is satisfied by oil passing through oil ports or passages —2— from the tube —8— completely filling the space —5— above check valve assembly and space —3— above leather washer —16— ready for another operation.

When piston assembly —11— is being returned to its top position by spring —14—, the rounded edge —29— of enlarged portion —26— again reverses leather washer —16— to the position shown in Figure 2, in which position it acts as a check valve preventing any passing or leakage of oil through the control under gravity head. The control has a double check against gravity leaks of oil, namely the outlet check valve and the action of the leather washer —16— above described.

Altho I have shown and described specific structures as illustrative of perhaps preferred embodiments of this invention, I do not desire to restrict myself to the details of the structure or the parts thereof, as various changes and modifications may be made within the scope of the appended claims.

I claim:

1. A lubricating system including a control device comprising a chamber for receiving a volume of lubricant, a member movable in the chamber under pressure of lubricant in the system to expel lubricant therefrom, and flexible means reversible to two positions upon opposite sides of a normal plane for preventing the outflow of lubricant from the chamber in one position and permitting its flow therefrom in another position.

2. A lubricating system including a control device comprising a chamber for receiving a volume of lubricant, a member movable in the chamber under pressure of lubricant in the system to expel lubricant therefrom, and an annular member in said chamber having its inner edge shiftable to two positions for preventing the flow of lubricant from the chamber in one position, and permitting its flow therefrom in another position.

3. A lubricating system including a control device comprising a chamber for receiving a volume of lubricant, a piston assembly movable in the chamber under pressure of lubricant in the system to expel lubricant therefrom, and an annular member in said chamber having its inner edge shiftable to two positions for preventing the flow of lubricant from the chamber in one position and permitting its flow therefrom in another position, said piston assembly including a portion movable through the opening in the annular member and acting to shift the inner edge of said member to the position where it prevents the flow of lubricant from the chamber.

4. A lubricating system including a control device comprising a chamber for receiving a volume of lubricant, a member movable in the chamber under pressure of lubricant in the system to expel lubricant therefrom, flexible means reversible to two positions upon opposite sides of a normal plane for preventing the out-flow of lubricant from the chamber in one position and permitting its flow therefrom in another position, and spring-actuated means for exerting pressure upon the lubricant in the system.

5. A lubricating system including a control device comprising a chamber for receiving a volume of lubricant, a member movable in the chamber under pressure of lubricant in the system to expel lubricant therefrom, an annular member in said chamber having its inner edge shiftable to two positions for preventing the flow of lubricant from the chamber in one position, and permitting its flow therefrom in another position, and spring-actuated means for exerting pressure upon the lubricant in the system.

6. A lubricating system including a control device comprising a chamber for receiving a volume of lubricant, a piston assembly movable in the chamber under pressure of lubricant in the system to expel lubricant therefrom, and an annular member in said chamber having its inner edge shiftable to two positions for preventing the flow of lubricant from the chamber in one position and permitting its flow therefrom in another position, said piston assembly including a portion movable through the opening in the annular member and acting to shift the inner edge of said member to the position where it prevents the flow of lubricant from the chamber, and spring-actuated means for exerting pressure upon the lubricant in the system.

7. A lubricating system including a control device comprising a chamber for receiving a volume of lubricant, a piston assembly movable in the chamber and including a cup washer adjacent the inlet end of the chamber and of a diameter substantially equal to the diameter of the chamber, an elongated reduced portion extending toward the outlet from the chamber and terminating in an enlarged head, and an annular flexible member in said chamber having its inner edge movable to two oppositely inclined positions, said enlarged head adapted to move through said opening to assist the annular flexible member in controlling the flow of lubricant from the chamber.

8. A lubricating system including a control device comprising a chamber for receiving a volume of lubricant, a piston assembly movable in the chamber and including a cup washer adjacent the inlet end of the chamber and of a diameter substantially equal to the diameter of the chamber, an elongated reduced portion extending toward the outlet from the chamber and terminating in an enlarged head, an annular flexible member in said chamber having its inner edge movable to two oppositely inclined positions, said enlarged head adapted to move through said opening to assist the annular flexible member in controlling the flow of lubricant from the chamber, and having a portion adapted to move the inner edge of the flexible member to its upwardly inclined position.

9. A lubricating system including a control device comprising a body having portions of different diameters separated by a shoulder, said shoulder having a beveled corner, a flexible annular member seated on the shoulder, a washer seated on the flexible member and having its inner edge beveled in a direction opposite to the bevel on the shoulder, thereby permitting the inner edge of the flexible member to be shifted to two oppositely inclined positions, and a piston assembly movable in the body and having a portion movable through the opening in the flexible member.

10. A lubricating system including a control device comprising a body having portions of different diameters separated by a shoulder, said shoulder having a beveled corner, a flexible annular member seated on the shoulder, a washer seated on the flexible member and having its inner edge beveled in a direction opposite to the bevel on the shoulder, thereby permitting the inner edge of the flexible member to be shifted to two oppositely inclined positions, a piston assembly movable in the body and having a portion at the inlet end of the body of a diameter substantially equal to the interior diameter of the body, an elongated intermediate portion of reduced diameter projecting toward the outlet from the body, and terminating in an enlarged head movable through the opening in said flexible member.

11. A lubricating system including a control device comprising a body having portions of different diameters separated by a shoulder, said shoulder having a beveled corner, a flexible annular member seated on the shoulder, a washer seated on the flexible member and having its inner edge beveled in a direction opposite to the bevel on the shoulder, thereby permitting the inner edge of the flexible member to be shifted to two oppositely inclined positions, a piston assembly movable in the body and having a portion at the inlet end of the body of a diameter substantially equal to the interior diameter of the body, an elongated intermediate portion of reduced diameter projecting toward the outlet from the body and terminating in an enlarged head movable through the opening in said flexible member, said enlarged head having a beveled portion adapted to actuate the inner edge of said flexible member.

12. A lubricating system including a control device comprising a body having portions of different diameters separated by a shoulder, said shoulder having a beveled corner, a flexible annular member seated on the shoulder, a washer seated on the flexible member and having its inner edge beveled in a direction opposite to the bevel on the shoulder, thereby permitting the inner edge of the flexible member to be shifted to two oppositely inclined positions, a piston assembly movable in the body and having a portion movable through the opening in the flexible member, and a spring interposed between the washer and a portion of the piston assembly.

13. A lubricating system including a control device comprising a chamber for receiving a volume of lubricant, a member movable in the chamber under pressure of lubricant in the system to expel lubricant therefrom, flexible means shiftable to two positions for preventing the outflow of lubricant from the chamber in one position and permitting its flow therefrom in another position, and a check valve preventing the flow of lubricant through the control device except under pressure of lubricant in said device.

14. A lubricating system including a control device comprising a chamber for receiving a volume of lubricant, a member movable in the chamber under pressure of lubricant in the system to expel lubricant therefrom, an annular member in said chamber having its inner edge shiftable to two positions for preventing the flow of lubricant from the chamber in one position and permitting its flow therefrom in another position, and a check valve preventing the flow of lubricant through the control device except under pressure of lubricant in said device.

15. A lubricating system including a control device comprising a chamber for receiving a volume of lubricant, a piston assembly movable in the chamber under pressure of lubricant in the system to expel lubricant therefrom, and an annular member in said chamber having its inner edge shiftable to two positions for preventing the flow of lubricant from the chamber in one position and permitting its flow therefrom in another position, said piston assembly including a portion movable through the opening in the annular member and acting to shift the inner edge of said member to the position where it prevents the flow of lubricant from the chamber, and a check valve preventing the flow of lubricant through the control device except under pressure of lubricant in said device.

16. A lubricating system including a control device comprising a chamber for receiving a volume of lubricant, a member movable in the chamber under pressure of lubricant in the system to expel lubricant therefrom, flexible means shiftable to two positions for preventing the outflow of lubricant from the chamber in one position and permitting its flow therefrom in another position, spring-actuated means for exerting pressure upon the lubricant in the system, and a check valve preventing the flow of lubricant through the control device except under pressure of lubricant in said device.

17. A lubricating system including a control device comprising a chamber for receiving a volume of lubricant, a member movable in the chamber under pressure of lubricant in the system to expel lubricant therefrom, an annular member in said chamber having its inner edge shiftable to two positions for preventing the flow of lubricant from the chamber in one position and permitting its flow therefrom in another position, spring-actuated means for exerting pressure upon the lubricant in the system, and a check valve preventing the flow of lubricant through the control device except under pressure of lubricant in said device.

18. A lubricating system including a control device comprising a chamber for receiving a volume of lubricant, a piston assembly movable in the chamber under pressure of lubricant in the system to expel lubricant therefrom, and an annular member in said chamber having its inner edge shiftable to two positions for preventing the flow of lubricant from the chamber in one postion and permitting its flow therefrom in another position, said piston assembly including a portion movable through the opening in the annular member and acting to shift the inner edge of said member to the position where it prevents the flow of lubricant from the chamber, spring-actuated means for exerting pressure upon the lubricant in the system, and a check valve preventing the flow of lubricant through the control device except under pressure of lubricant in said device.

19. A lubricating system including a control device comprising a chamber for receiving a volume of lubricant, a piston assembly movable in the chamber and including a cup washer adjacent the inlet end of the chamber and of a diameter substantially equal to the diameter of the chamber, an elongated reduced portion extending toward the outlet from the chamber and terminating in an enlarged head, an annular flexible member in said chamber having its inner edge movable to two oppositely inclined positions, said enlarged head adapted to move through said opening to assist the annular flexible member in controlling the flow of lubricant from the chamber, and a check valve preventing the flow of lubricant through the control device except under pressure of lubricant in said device.

20. A lubricating system including a control device comprising a chamber for receiving a volume of lubricant, a piston assembly movable in the chamber and including a cup washer adjacent the inlet end of the chamber and of a diameter substantially equal to the diameter of the chamber, an elongated reduced portion extending toward the outlet from the chamber and terminating in an enlarged head, an annular flexible member in said chamber having its inner edge movable to two oppositely inclined positions, said enlarged head adapted to move through said opening to assist the annular flexible member in controlling the flow of lubricant from the chamber and having a portion adapted to move the inner edge of the flexible member to its upwardly inclined position, and a check valve preventing the flow of lubricant through the control device except under pressure of lubricant in said device.

21. A lubricating system including a control device comprising a body having portions of different diameters separated by a shoulder, said shoulder having a beveled corner, a flexible annular member seated on the shoulder, a washer seated on the flexible member and having its inner edge beveled in a direction opposite to the bevel on the shoulder, thereby permitting the inner edge of the flexible member to be shifted to two oppositely inclined positions, a piston assembly movable in the body and having a portion movable through the opening in the flexible member, and a check valve preventing the flow of lubricant through the control device except under pressure of lubricant in said device.

22. A lubricating system including a control device comprising a body having portions of different diameters separated by a shoulder, said shoulder having a beveled corner, a flexible annular member seated on the shoulder, a washer seated on the flexible member and having its inner edge beveled in a direction opposite to the bevel of the shoulder, thereby permitting the inner edge of the flexible member to be shifted to two oppositely inclined positions, a piston assembly movable in the body and having a portion at the inlet end of the body of a diameter substantially equal to the interior diameter of the body, an elongated intermediate portion of reduced diameter projecting toward the outlet from the body and terminating in an enlarged head movable through the opening in said flexible member, and a check valve preventing the flow of lubricant through the control device except under pressure of lubricant in said device.

23. A lubricating system including a control device comprising a body having portions of different diameters separated by a shoulder, said shoulder having a beveled corner, a flexible annular member seated on the shoulder, a washer seated on the flexible member and having its inner edge beveled in a direction opposite to the bevel on the shoulder, thereby permitting the inner edge of the flexible member to be shifted to two oppositely inclined positions, a piston assembly movable in the body and having a portion at the inlet end of the body of a diameter substantially equal to the interior diameter of the body, an enlongated intermediate portion of reduced diameter projecting toward the outlet from the body and terminating in an enlarged head movable through the opening in said flexible member, said enlarged head having a beveled portion adapted to actuate the inner edge of said flexible member, and a check valve preventing the flow of lubricant through the control device except under pressure of lubricant in said device.

24. A lubricating system including a control device comprising a body having portions of different diameters separated by a shoulder, said shoulder having a beveled corner, a flexible annular member seated on the shoulder, a washer seated on the flexible member and having its inner edge beveled in a direction opposite to the bevel on the shoulder, thereby permitting the inner edge of the flexible member to be shifted to two oppositely inclined positions, a piston assembly movable in the body and having a portion movable through the opening in the flexible member, a spring interposed between the washer and a portion of the piston assembly, and a check valve preventing the flow of lubricant through the control device except under pressure of lubricant in said device.

25. A lubricating system including a control device comprising a tubular chamber for receiving a volume of lubricant, a piston movable in said chamber under pressure of lubricant in the system to expel lubricant therefrom, means including a transverse slot in the piston and a port in the wall of the tubular chamber to permit lubricant to bypass the piston, and flexible means reversible to positions upon opposite sides of a normal plane for preventing the outflow of lubricant from the chamber in one position and permitting its flow therefrom in another position, and means connected with the piston and movable through the opening in said washer.

In witness whereof I have hereunto set my hand this 16th day of September, 1926.

FREDERICK H. GLEASON.